US011866098B2

(12) United States Patent
Hong et al.

(10) Patent No.: US 11,866,098 B2
(45) Date of Patent: Jan. 9, 2024

(54) VEHICLE BODY STRUCTURE

(71) Applicants: HYUNDAI MOTOR COMPANY, Seoul (KR); KIA CORPORATION, Seoul (KR)

(72) Inventors: Deok Hwa Hong, Suwon-si (KR); Hee Seouk Chung, Hwaseong-si (KR); Hyun Sik Kim, Seoul (KR); Byeong Cheon Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/120,010

(22) Filed: Mar. 10, 2023

(65) Prior Publication Data

US 2023/0219628 A1 Jul. 13, 2023

Related U.S. Application Data

(62) Division of application No. 17/401,001, filed on Aug. 12, 2021, now Pat. No. 11,628,887.

(30) Foreign Application Priority Data

Dec. 3, 2020 (KR) ........................ 10-2020-0167382

(51) Int. Cl.
| | | |
|---|---|---|
| *B62D 25/20* | (2006.01) | |
| *B62D 25/04* | (2006.01) | |
| *B62D 25/02* | (2006.01) | |
| *B62D 27/02* | (2006.01) | |
| *B62D 25/14* | (2006.01) | |
| *B62D 25/08* | (2006.01) | |

(52) U.S. Cl.
CPC ........... *B62D 25/20* (2013.01); *B62D 25/025* (2013.01); *B62D 25/04* (2013.01); *B62D 25/08* (2013.01); *B62D 25/14* (2013.01); *B62D 27/023* (2013.01); *B62D 25/085* (2013.01)

(58) Field of Classification Search
CPC .... B62D 25/025; B62D 25/04; B62D 25/023; B62D 21/15; B62D 25/08
USPC ... 296/23.01–23.3, 29, 30, 209, 193.06, 204
See application file for complete search history.

(56) References Cited

U.S. PATENT DOCUMENTS 6,273,486 B1 8/2001 Ezzat et al.

FOREIGN PATENT DOCUMENTS

WO 2018188216 A1 10/2018

*Primary Examiner* — Dennis H Pedder
(74) *Attorney, Agent, or Firm* — LEMPIA SUMMERFIELD KATZ LLC (57) ABSTRACT

A vehicle body structure includes: a front pillar joined to a dash panel; a front side member extending from the dash panel toward the front of a vehicle; a side sill connected to a bottom end of the front pillar; a rear lower member connecting a rear portion of the front side member and a front portion of the side sill; and a connection member connecting at least two of the front pillar, the side sill, and the rear lower member. The connection member is integrally connected to the front pillar, the side sill, or the rear lower member to form a unitary one piece structure therewith.

8 Claims, 13 Drawing Sheets

VEHICLE BODY STRUCTURE

CROSS-REFERENCE TO RELATED APPLICATION

This application is a divisional of U.S. application Ser. No. 17/401,001 filed Aug. 12, 2021, which claims priority under 35 U.S.C. § 119 to Korean Patent Application No. 10-2020-0167382, filed on Dec. 3, 2020 in the Korean Intellectual Property Office, the disclosure of which are incorporated herein in their entirety by reference.

TECHNICAL FIELD

The present disclosure relates to a vehicle body structure, and more particularly, to a vehicle body structure firmly connecting a front pillar, a side sill, and a rear lower member, thereby improving crashworthiness and uniformly distributing impact energy.

BACKGROUND

As is well known in the art, a vehicle body structure includes a dash panel by which a front compartment and a passenger compartment are divided, and includes a pair of front side members, which are disposed in front of the dash panel. The pair of front side members may be spaced apart from each other in a transverse direction of the vehicle on the front of the vehicle. A pair of side sills may be connected to the pair of front side members, respectively. A front portion of each side sill may be connected to a rear portion of each front side member through a rear lower member. A pair of front pillars (for example, A-pillars) may be joined to both side edges of the dash panel, respectively.

In recent years, in order to achieve weight reduction of the vehicle, the front pillar, the rear lower member, and the side sill may be made of an aluminum-based material. During an assembly process of the vehicle body structure, a front structure including the dash panel, a rear floor, and a center floor may be loaded along a height direction of the vehicle. The pair of front pillars may then be loaded on both side edges of the dash panel in a transverse direction of the vehicle. A bottom end portion of each front pillar may be joined to the rear lower member using fasteners, welding, and/or the like. The bottom end portion of the front pillar may be joined to a top end portion of the rear lower member along the transverse direction of the vehicle.

When the front portion of the vehicle body including the front pillar is deformed in the event of a vehicle impact/collision, a front door will not open, which may lead to safety problems. In particular, the bottom end portion of the front pillar and the top end portion of the rear lower member may be easily separated during a frontal collision of the vehicle.

The above information described in this background section is provided to assist in understanding the background of the inventive concept, and may thus include any technical concept which is not considered as the prior art that is already known to those having ordinary skill in the art.

SUMMARY

The present disclosure has been made to solve the above-mentioned problems occurring in the prior art while maintaining advantages achieved by the prior art.

An aspect of the present disclosure provides a vehicle body structure firmly connecting a front pillar, a side sill, and a rear lower member, thereby improving crashworthiness and uniformly distributing impact energy.

According to an aspect of the present disclosure, a vehicle body structure may include: a front pillar joined to a dash panel; a front side member extending from the dash panel toward the front of a vehicle; a side sill connected to a bottom end of the front pillar; a rear lower member connecting a rear portion of the front side member and a front portion of the side sill; and a connection member connecting at least two of the front pillar, the side sill, and the rear lower member.

The connection member may include a first mounting wall that is parallel to a mounting surface of the front pillar and a mounting surface of the rear lower member and may include a second mounting wall that is parallel to a mounting surface of the side sill.

The first mounting wall may be joined to the mounting surface of the front pillar.

The first mounting wall may be joined to the mounting surface of the rear lower member.

The second mounting wall may be joined to the mounting surface of the side sill.

The rear lower member may have a horizontal flange joined to a bottom wall of the side sill.

The rear lower member may include a front-side connection portion connected to the rear portion of the front side member and may include a rear-side connection portion connected to the front portion of the side sill.

A top wall of the rear-side connection portion may be joined to a top wall of the side sill.

An inboard side wall of the rear-side connection portion may be joined to an inboard side wall of the side sill.

The side sill may have a recessed wall provided in the front portion thereof and a cavity defined by the recessed wall. The rear-side connection portion of the rear lower member may be received in the cavity.

An outboard side wall of the rear-side connection portion may be joined to the recessed wall of the side sill.

The connection member may be integrally connected to the front pillar so that the connection member and the front pillar may form a unitary one-piece structure.

The connection member may include an extension wall extending vertically from the bottom end of the front pillar and a mounting wall extending horizontally from a bottom end of the extension wall. The mounting wall may be parallel to the mounting surface of the side sill and the mounting wall may be joined to the mounting surface of the side sill.

The mounting surface of the front pillar may be joined to the mounting surface of the rear lower member.

The connection member may be integrally connected to the side sill so that the connection member and the side sill may form a unitary one-piece structure.

The connection member may be a mounting wall extending vertically from a top end of the side sill. The connection member may be parallel to the mounting surface of the front pillar and the mounting surface of the rear lower member. The connection member may be joined to the mounting surface of the front pillar and the mounting surface of the rear lower member.

The connection member may be integrally connected to the rear lower member so that the connection member and the rear lower member may form a unitary one-piece structure.

The connection member may be a mounting wall extending from the rear lower member toward the side sill. The connection member may be parallel to a top surface of the side sill and the connection member may be joined to the top surface of the side sill.

The mounting surface of the front pillar may be joined to the mounting surface of the rear lower member.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure will has been omitted in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those having ordinary skill in the field of art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

Figure 1:
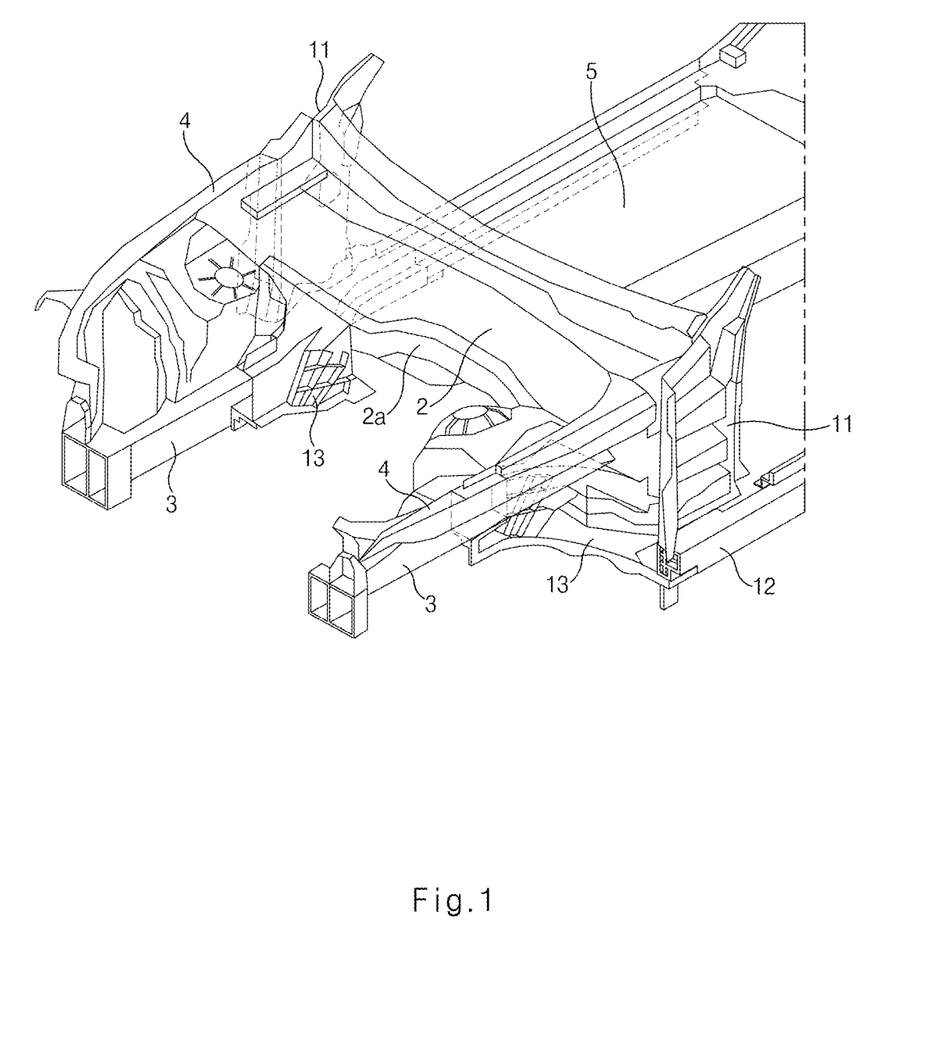
FIG. 1 illustrates a perspective view of a vehicle body structure according to an embodiment of the present disclosure.

Referring to FIG. 1, a vehicle body structure according to an embodiment of the present disclosure may include a dash panel 2, a pair of front side members 3 extending from the dash panel 2 toward the front of the vehicle, a pair of front pillars 11 joined to both side edges of the dash panel 2, and a pair of side sills 12 connected to bottom ends of the pair of front pillars 11, respectively.

A front compartment and a passenger compartment may be divided by the dash panel 2. The front compartment may contain a power train including an electric motor or an internal combustion engine. A dash crossmember 2a may be attached to the front of the dash panel 2.

The pair of front side members 3 may be spaced apart from each other in a transverse direction of the vehicle, and each front side member 3 may extend in a longitudinal direction of the vehicle. Each front side member 3 may have a front portion and a rear portion. A bumper (not shown) may be connected between the front portions of the pair of front side members 3. The rear portion of each front side member 3 may be connected to a front portion of each side sill 12 through a rear lower member 13.

The pair of front pillars 11 may be joined to both side edges of the dash panel 2, respectively. Each front pillar 11 may be connected to the rear lower member 13 and the front portion of the side sill 12. The front pillar 11 may be a front pillar inner panel disposed in a side structure of the vehicle body toward the interior of the vehicle.

The front pillar 11 may have an inboard side surface facing the interior of the vehicle and an outboard side surface facing the exterior of the vehicle. According to an embodiment, the front pillar 11 may be any one of a steel pressed component, an aluminum pressed component, an aluminum die-cast component, or an aluminum low-pressure cast component.

Figure 4:
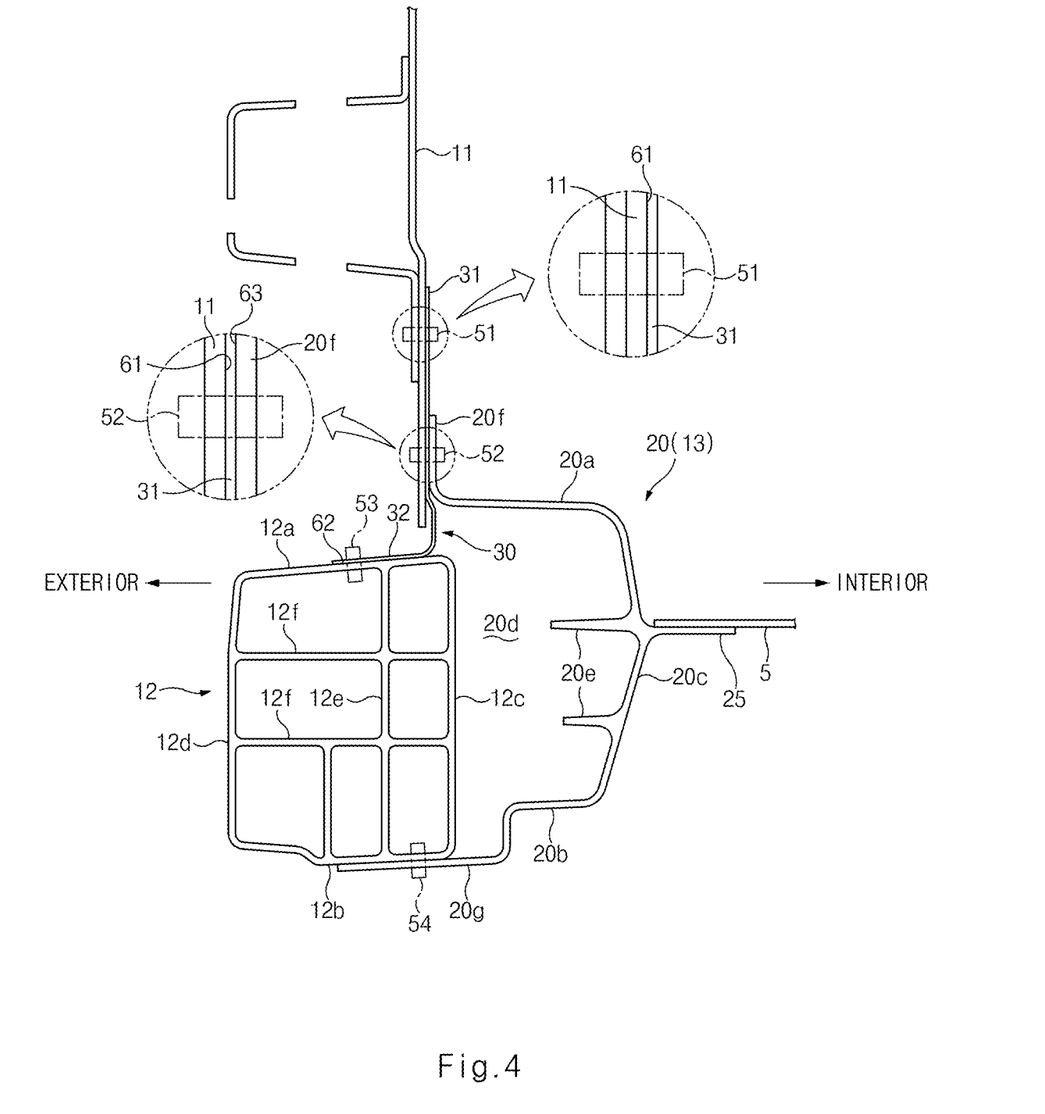
FIG. 4 illustrates a cross-sectional view, taken along line A-A of FIG. 3.

The pair of side sills 12 may be joined to both side edges of a floor 5, respectively. Each side sill 12 may extend in the longitudinal direction of the vehicle. A plurality of seat crossmembers 5a may be mounted on the floor 5, and an intermediate member 6 may be mounted on a rear edge of the floor 5. Referring to FIG. 4, each side sill 12 may have a top wall 12a facing the top of the vehicle, a bottom wall 12b facing the bottom of the vehicle, an inboard side wall 12c facing the interior of the vehicle, and an outboard side wall 12d facing the exterior of the vehicle. The side sill 12 may have a closed transverse cross section defined by the top wall 12a, the bottom wall 12b, the inboard side wall 12c, and the outboard side wall 12d. A plurality of vertical ribs 12e and a plurality of horizontal ribs 12f may be provided in an internal space of the side sill 12. The vertical rib 12e may extend vertically, and the horizontal rib 12f may extend horizontally. According to an embodiment, the side sill 12 may be any one of an aluminum extruded component, an aluminum die-cast component, a combination of a steel pressed component and a steel pressed reinforcement, a combination of a steel pressed component and an aluminum extruded reinforcement, or an aluminum low-pressure cast component.

Figure 2:
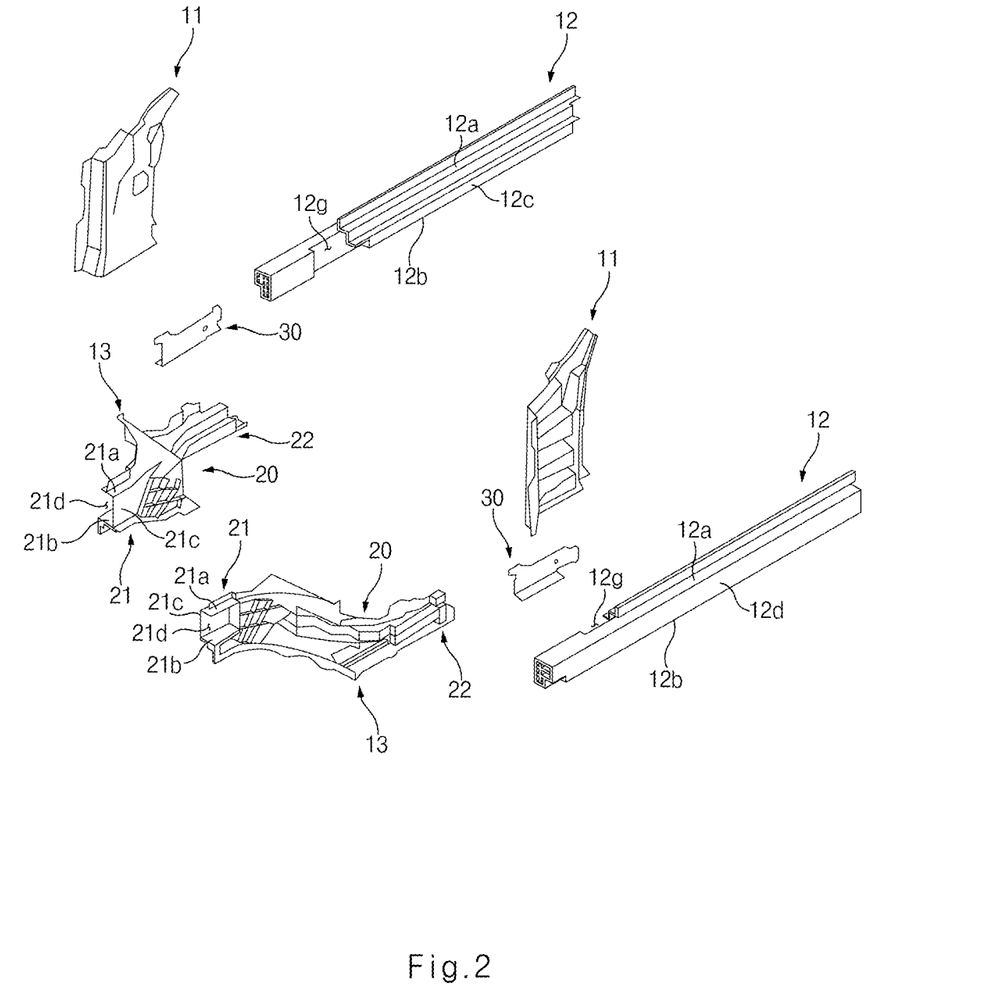
FIG. 2 illustrates an exploded perspective view of a vehicle body structure according to an embodiment of the present disclosure.
Figure 3:
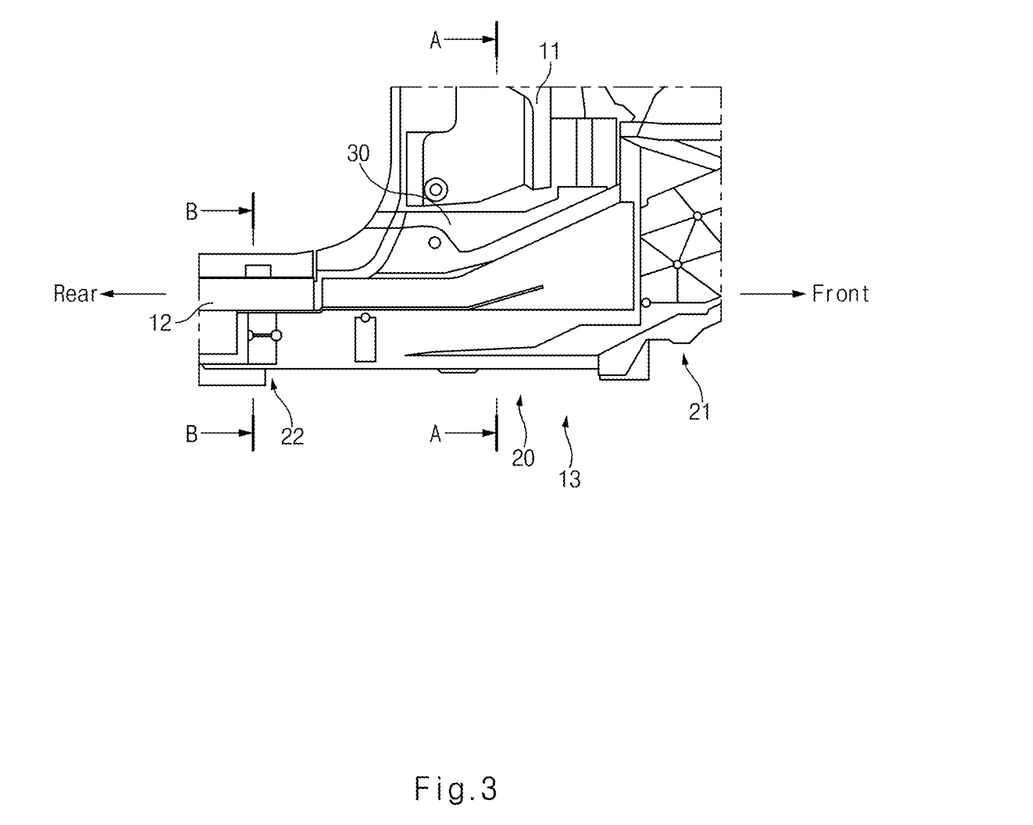
FIG. 3 illustrates part of a vehicle body structure according to an embodiment of the present disclosure, which is viewed from the interior of the vehicle.
Figure 5:
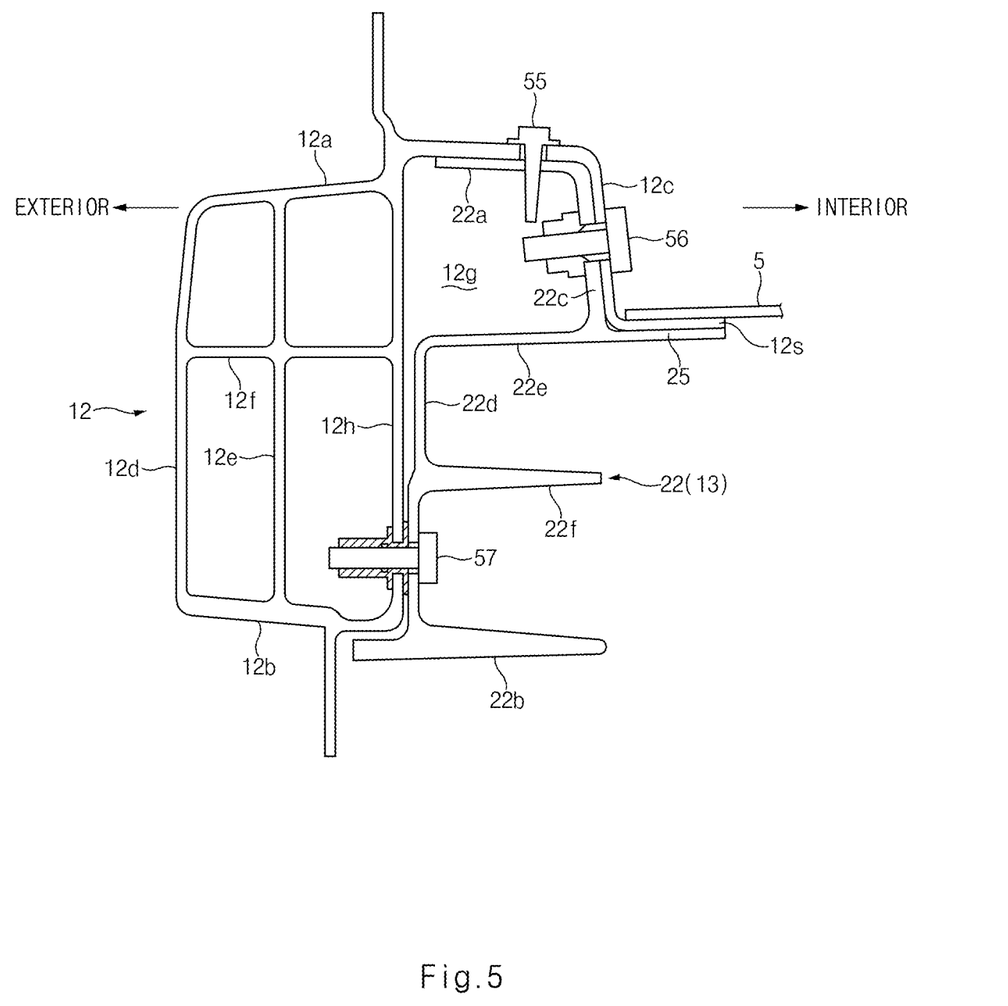
FIG. 5 illustrates a cross-sectional view, taken along line B-B of FIG. 3.

Referring to FIGS. 2 and 5, each side sill 12 may have a recessed wall 12h provided in the front portion thereof, and a cavity 12g defined by the recessed wall 12h. The recessed wall 12h may be recessed from the inboard side wall 12c toward the outboard side wall 12d. The cavity 12g may be open to the interior of the vehicle, and the cavity 12g may be spaced apart from a front end surface of the side sill 12 by a predetermined distance. The cavity 12g may have a volume enough to receive a rear portion of the rear lower member 13. Referring to FIGS. 3 and 5, the rear portion of the rear lower member 13 may be received in the cavity 12g of the side sill 12.

The pair of rear lower members 13 may be symmetrically disposed on both sides of the dash panel 2. Each rear lower member 13 may connect the rear portion of each front side member 3 and the front portion of the corresponding side sill 12. According to an embodiment, the rear lower member 13 may be any one of an aluminum die-cast component or an aluminum low-pressure cast component.

Each rear lower member 13 may include a main body 20, a front-side connection portion 21 disposed on the front of the main body 20, and a rear-side connection portion 22 disposed on the rear of the main body 20.

The main body 20 may be bent from a longitudinal axis of the front side member 3 toward a longitudinal axis of the side sill 12. Referring to FIG. 4, the main body 20 may include a top wall 20a facing the top of the vehicle, a bottom wall 20b facing the bottom of the vehicle, and an inboard side wall 20c facing the interior of the vehicle. The main body 20 may have a cavity 20d open to the exterior of the vehicle, and a plurality of horizontal ribs 20e extending horizontally within the cavity 20d. The cavity 20d may be defined by the top wall 20a, the bottom wall 20b, and the inboard side wall 20c. The main body 20 may have a vertical flange 20f extending vertically from the top wall 20a, and a horizontal flange 20g extending horizontally from the bottom wall 20b.

The front-side connection portion 21 may extend from the main body 20 toward the front of the vehicle. The front-side connection portion 21 may be aligned with the front side member 3 along the longitudinal direction of the vehicle. The front-side connection portion 21 may be connected to the rear portion of the front side member 3 by using fasteners, welding, and/or the like. Referring to FIG. 2, the front-side connection portion 21 may have a top wall 21a facing the top of the vehicle, a bottom wall 21b facing the bottom of the vehicle, and an inboard side wall 21c facing the interior of the vehicle. The front-side connection portion 21 may have a cavity 21d open to the exterior of the vehicle. The rear portion of the front side member 3 may be received in the cavity 21d of the front-side connection portion 21.

The rear-side connection portion 22 may extend from the main body 20 toward the rear of the vehicle. The rear-side connection portion 22 may be aligned with the side sill 12 along the longitudinal direction of the vehicle. The rear-side connection portion 22 may be connected to the front portion of the side sill 12 by using fasteners, welding, and/or the like. Referring to FIG. 5, the rear-side connection portion 22 may have a top wall 22a facing the top of the vehicle, a bottom wall 22b facing the bottom of the vehicle, an inboard side wall 22c facing the interior of the vehicle, an outboard side wall 22d facing the exterior of the vehicle, a horizontal wall 22e connecting the inboard side wall 22c and the outboard side wall 22d, and a horizontal rib 22f protruding horizontally from the outboard side wall 22d.

Referring to FIGS. 4 and 5, each rear lower member 13 may have an inboard side flange 25 protruding toward the interior of the vehicle. The inboard side flange 25 may be joined to each side edge of the floor 5 by using fasteners, welding, and/or the like.

A pair of fender apron members 4 may extend from the pair of front pillars 11 toward the front of the vehicle, respectively. Each fender apron member 4 may extend from each front pillar 11 toward the corresponding front side member 3. A rear portion of the fender apron member 4 may be connected to the front pillar 11, and a front portion of the fender apron member 4 may be connected to the front side member 3.

Referring to FIG. 4, the front pillar 11 may have a mounting surface 61 to which a first mounting wall 31 of a connection member 30 is joined. For example, the mounting surface 61 may be the inboard side surface of the front pillar 11, and the mounting surface 61 may be a flat surface vertically extended. Specifically, the mounting surface 61 may be provided on the inboard side surface of the bottom end portion of the front pillar 11.

Referring to FIG. 4, the rear lower member 13 may have a mounting surface 63 to which the first mounting wall 31 of the connection member 30 is joined. For example, the mounting surface 63 may be an outboard side surface of the rear lower member 13, and the mounting surface 63 may be a flat surface vertically extended. Specifically, the mounting surface 63 may be provided on the vertical flange 20f of the rear lower member 13.

Referring to FIG. 4, the side sill 12 may have a mounting surface 62 to which a second mounting wall 32 of the connection member 30 is joined. For example, the mounting surface 62 may be a top surface of the side sill 12, and the mounting surface 62 may be a flat surface horizontally extended. Specifically, the mounting surface 62 may be provided on the top wall 12a of the side sill 12.

Referring to FIG. 2, the pair of connection members 30 may be symmetrically disposed on both sides of the vehicle. Each connection member 30 may connect at least two of the front pillar 11, the side sill 12, and the rear lower member 13.

Each connection member 30 may include the first mounting wall 31 joined to the mounting surface 61 of the front pillar 11 and the mounting surface 63 of the rear lower member 13, and the second mounting wall 32 joined to the top wall 12a of the side sill 12. According to an embodiment, the connection member 30 may be any one of a steel pressed component, an aluminum pressed component, an aluminum extruded component, an aluminum die-cast component, or an aluminum low-pressure cast component.

The first mounting wall 31 may be parallel to the mounting surface 61 of the front pillar 11 and the mounting surface 63 of the rear lower member 13. As the first mounting wall 31 is interposed between the mounting surface 61 of the front pillar 11 and the mounting surface 63 of the rear lower member 13, the first mounting wall 31 may tightly contact the mounting surface 61 of the front pillar 11 and the mounting surface 63 of the rear lower member 13. The first mounting wall 31 may be joined to the mounting surface 61 of the front pillar 11 and the mounting surface 63 of the rear lower member 13 using fasteners, welding, and/or the like.

A vertical length of the first mounting wall 31 may be greater than a vertical length of the vertical flange 20f of the rear lower member 13. A top end of the first mounting wall 31 may be located higher than a top end of the vertical flange 20f of the rear lower member 13. Referring to FIG. 4, an upper portion of the first mounting wall 31 may be joined to the mounting surface 61 of the front pillar 11 through a first joint 51. The mounting surface 61 of the front pillar 11 may be the inboard side surface of the bottom end portion of the front pillar 11 facing the interior of the vehicle. A lower portion of the first mounting wall 31 may be joined to the mounting surface 63 of the rear lower member 13 through a second joint 52. The mounting surface 63 of the rear lower member 13 may be an outboard side surface of the vertical flange 20f facing the exterior of the vehicle.

For example, the first joint 51 may be any fastener or joint used for a one sided assembly, a two sided assembly, dissimilar joining, or welding. In other words, the first joint 51 may be any one of a one sided fastener, a two sided fastener, a dissimilar joint, or a welding joint. Specifically, the first joint 51 may be any fastener or joint used for friction element welding (FEW), RIVTAC, blind rivets, bolting, self-piercing rivets (SPR), resistance element welding (REW), clinching, or spot welding using steel or aluminum.

For example, the second joint 52 may be any one of a one sided fastener or a two sided fastener. Specifically, the second joint 52 may be any fastener or joint used for flow drill screw (FDS), RIVTAC, blind rivets, bolting, SPR, or REW.

Figure 6:
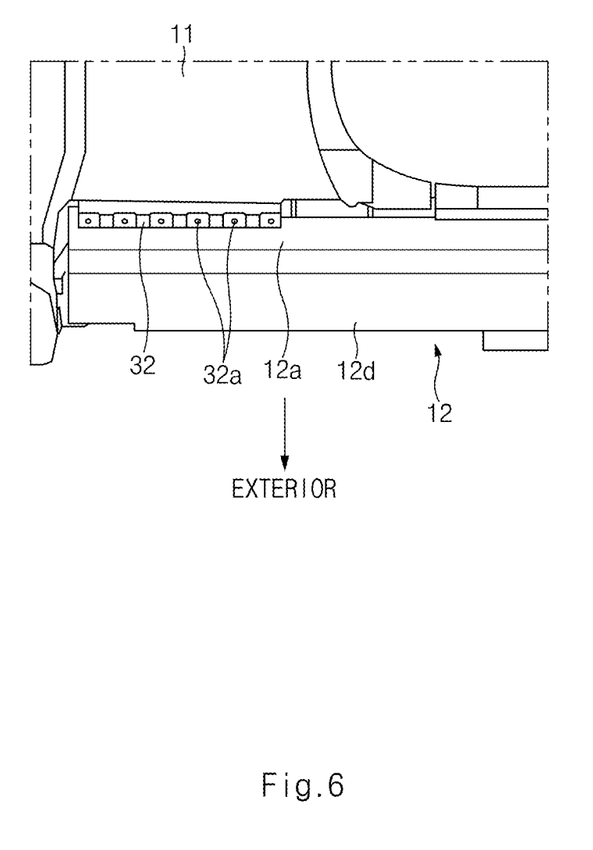
FIG. 6 illustrates part of a vehicle body structure according to an embodiment of the present disclosure, which is viewed from the exterior of the vehicle.

The second mounting wall 32 may be parallel to the mounting surface 62 of the side sill 12. The second mounting wall 32 may be joined to the mounting surface 62 of the side sill 12 by using fasteners, welding, and/or the like. Referring to FIG. 4, the second mounting wall 32 may be joined to the mounting surface 62 of the side sill 12 through a third joint 53. The mounting surface 62 of the side sill 12 may be a top surface of the top wall 12a facing the top of the vehicle. The horizontal flange 20g of the rear lower member 13 may be joined to the bottom wall 12b of the side sill 12 through a fourth joint 54. Referring to FIG. 6, the second mounting wall 32 may be exposed to the exterior of the vehicle, and the second mounting wall 32 may have a plurality of through holes 32a for installation of the third joint 53.

For example, the third joint 53 may be any one of a one sided fastener or a two sided fastener. Specifically, the third joint 53 may be any fastener or joint used for FEW, RIVTAC, blind rivets, or bolting.

For example, the fourth joint 54 may be any one of a one sided fastener or a two sided fastener. Specifically, the fourth joint 54 may be any fastener or joint used for FDS, RIVTAC, blind rivets, or bolting.

Referring to FIG. 5, the rear-side connection portion 22 may be received in the cavity 12g of the side sill 12. The rear-side connection portion 22 may be joined to the cavity 12g of the side sill 12 by using fasteners, welding, and/or the like. The top wall 22a of the rear-side connection portion 22 may be joined to the top wall 12a of the side sill 12 through a fifth joint 55. The inboard side wall 22c of the rear-side connection portion 22 may be joined to the inboard side wall 12c of the side sill 12 through a sixth joint 56. The outboard side wall 22d of the rear-side connection portion 22 may be joined to the recessed wall 12h of the side sill 12 through a seventh joint 57.

For example, the fifth joint 55 may be any one of a one sided fastener or a two sided fastener. Specifically, the fifth joint 55 may be any fastener or joint used for FEW, RIVTAC, blind rivets, or bolting.

For example, the sixth joint 56 may be any one of a one sided fastener or a two sided fastener. Specifically, the sixth joint 56 may be any fastener or joint used for FDS, RIVTAC, blind rivets, or bolting.

For example, the seventh joint 57 may be any one of a one sided fastener, a two sided fastener, or a dissimilar joint. Specifically, the seventh joint 57 may be any fastener or joint used for FDS, RIVTAC, blind rivets, bolting, SPR, or clinching.

Figure 7:
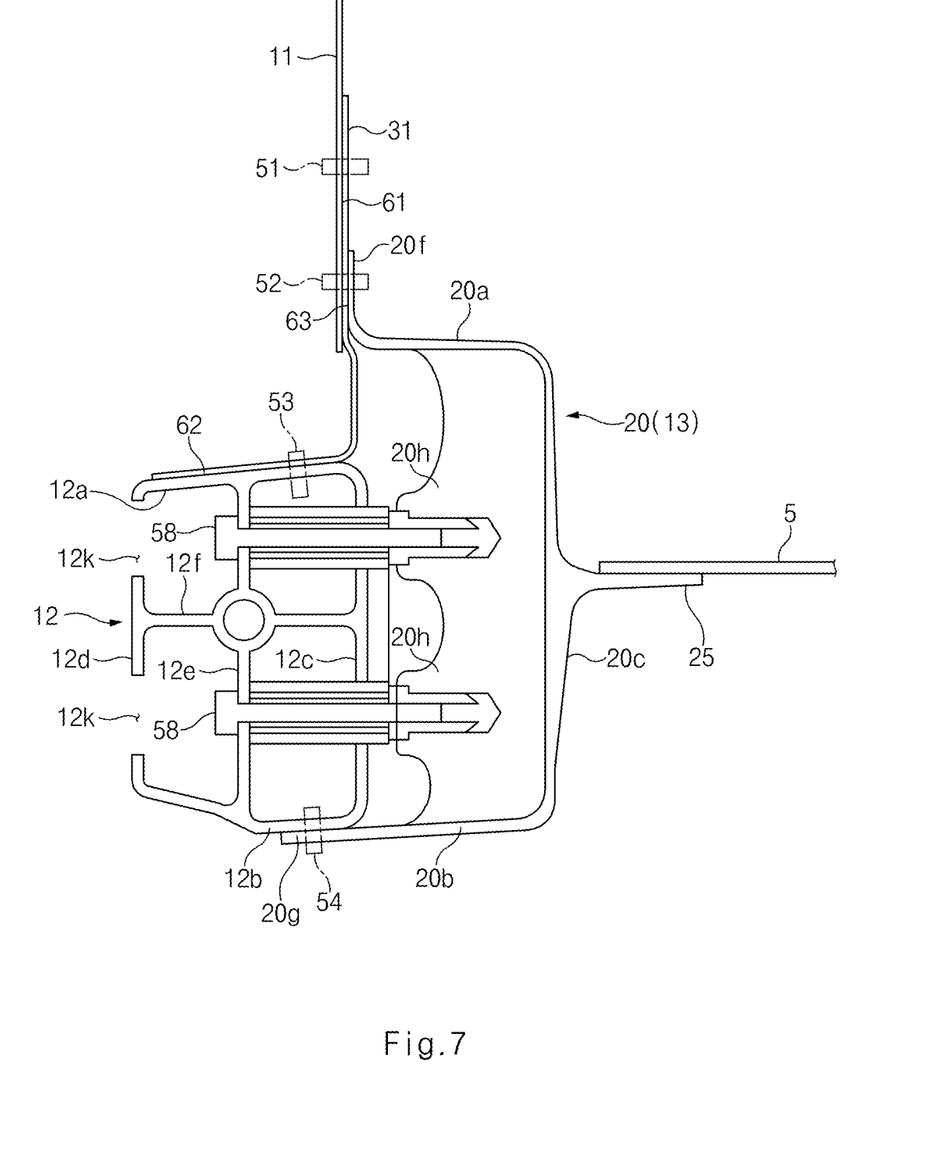
FIG. 7 illustrates a modification of the vehicle body structure illustrated in FIG. 4.

FIG. 7 illustrates a modification of the main body 20 of the rear lower member 13 illustrated in FIG. 4. Referring to FIG. 7, the main body 20 may have a plurality of bosses 20h provided within the cavity 20d. The inboard side wall 12c of the side sill 12 may be joined to the plurality of bosses 20h through a plurality of fasteners 58. The outboard side wall 12d of the side sill 12 may have through holes 12k through which the plurality of fasteners 58 pass. Each fastener 58 may pass through the through hole 12k of the side sill 12 and join the inboard side wall 12c of the side sill 12 and the boss 20h of the rear lower member 13.

According to an embodiment, the connection member 30 and the rear lower member 13 may be preassembled. Then the front pillar 11 and the side sill 12 may be assembled with the connection member 30 and the side sill 12 and the rear lower member 13 may be assembled.

According to another embodiment, the connection member 30 and the front pillar 11 may be preassembled. Then the rear lower member 13 and the side sill 12 may be assembled with the connection member 30 and the side sill 12 and the rear lower member 13 may be assembled.

According to another embodiment, the connection member 30 and the side sill 12 may be preassembled. Then the front pillar 11 and the rear lower member 13 may be assembled with the connection member 30 and the side sill 12 and the rear lower member 13 may be assembled.

Figure 8:
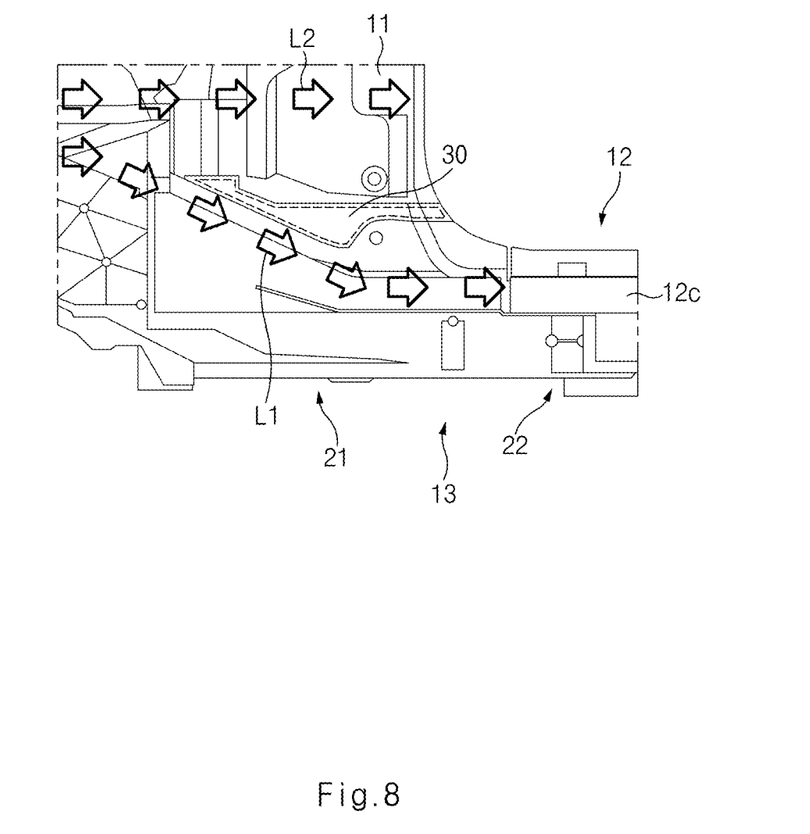
FIG. 8 illustrates the transfer of a load with respect to the inboard side of a vehicle body structure according to an embodiment of the present disclosure.
Figure 9:
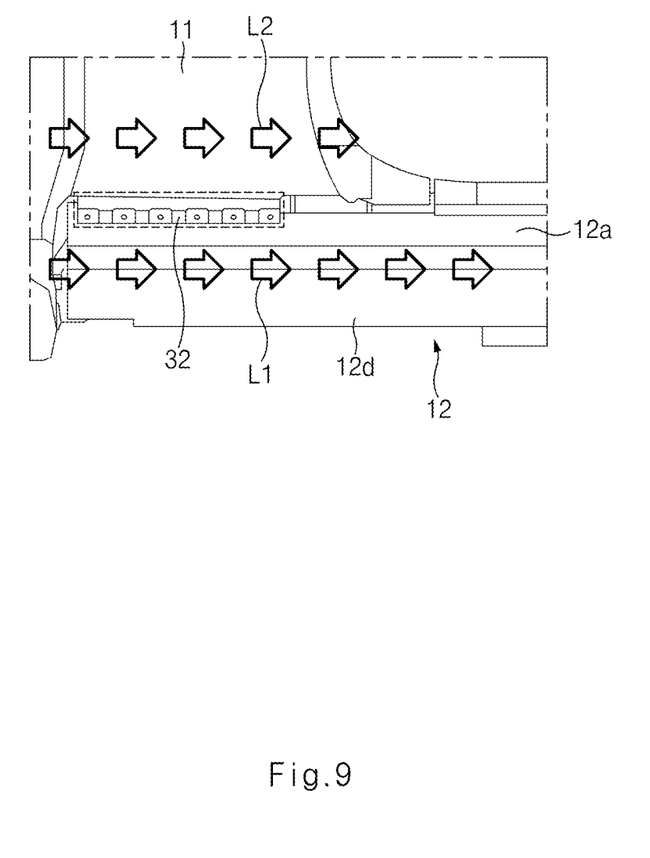
FIG. 9 illustrates the transfer of a load with respect to the outboard side of a vehicle body structure according to an embodiment of the present disclosure.

When a frontal collision of the vehicle occurs, frontal impact loads L1 and L2 may be transferred to the front side member 3. As illustrated in FIGS. 8 and 9, one (frontal impact load L1) of the frontal impact loads L1 and L2 may be transferred to the rear lower member 13 and the side sill 12 and the other frontal impact load L2 may be transferred to the front pillar 11 and the side sill 12. When the frontal impact loads L1 and L2 are transferred to the connection member 30, they may act on the plurality of joints 51, 52, 53, 54, 55, 56, 57, and 58, whereby the loads transferred in the longitudinal direction of the vehicle may be firmly supported. Thus, the frontal impact loads may be stably supported, and stiffness of the vehicle body in the longitudinal direction may be stably maintained.

Figure 10:
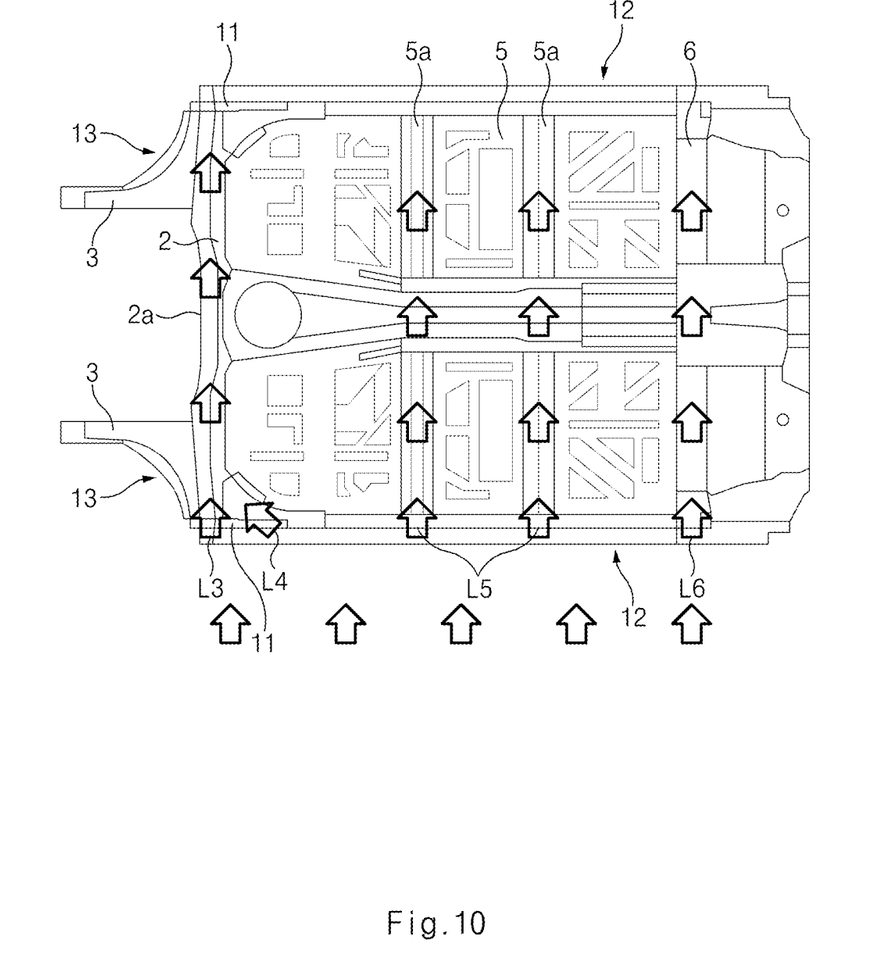
FIG. 10 illustrates the transfer of a load with respect to a flat floor of a vehicle body structure according to an embodiment of the present disclosure.

When a side collision of the vehicle occurs, side impact loads L3, L4, L5, and L6 may be transferred to the side sill 12. As illustrated in FIG. 10, one (side impact load L3) of the side impact loads L3, L4, L5, and L6 may be transferred from the side sill 12 to the dash crossmember 2a of the dash panel 2 through the rear lower member 13. Another side impact load L4 may be transferred from the side sill 12 to the dash crossmember 2a of the dash panel 2 through the front pillar 11. Another side impact load L5 may be transferred from the side sill 12 to the seat crossmembers 5a and the other side impact load L6 may be transferred from the side sill 12 to the intermediate member 6. When the side impact loads L3, L4, L5, and L6 are transferred to the connection member 30, a compressive load may act on some joints 51, 52, 56, 57, and 58, and a shear load may act on the other joints 53, 54, and 55, whereby the loads transferred in the transverse direction of the vehicle may be firmly supported. Thus, the side impact loads may be stably supported and stiffness of the vehicle body in the transverse direction may be stably maintained.

The position of the connection member 30 may be varied as shown in table 1 below.

TABLE 1

|  | Front Pillar 11 | Side Sill 12 | Rear Lower Member 13 |
|---|---|---|---|
| Transverse direction of Vehicle | Inboard Side Surface Outboard Side | Inboard Side Surface Outboard Side |  Outboard Side |

TABLE 1-continued

| | Front Pillar 11 | Side Sill 12 | Rear Lower Member 13 |
|---|---|---|---|
| Longitudinal Direction of Vehicle | Surface Front Surface Rear Surface | Surface Front Surface | Surface |
| Height Direction of Vehicle | Bottom Portion | Top Portion Bottom Portion | Top Portion Bottom Portion |

According to the embodiment illustrated in FIG. 4, the inboard side surface of the front pillar 11 facing the interior of the vehicle may serve as the mounting surface 61, the top surface of the side sill 12 facing the top of the vehicle may serve as the mounting surface 62, and the outboard side surface of the rear lower member 13 facing the exterior of the vehicle may serve as the mounting surface 63. Thus, the connection member 30 may be joined to the inboard side surface of the front pillar 11, the top surface of the side sill 12, and the outboard side surface of the rear lower member 13.

According to another embodiment, an outboard side surface of the front pillar 11 facing the exterior of the vehicle may serve as the mounting surface 61, a top surface of the side sill 12 facing the top of the vehicle may serve as the mounting surface 62, and an outboard side surface of the rear lower member 13 facing the exterior of the vehicle may serve as the mounting surface 63. Thus, the connection member 30 may be joined to the outboard side surface of the front pillar 11, the top surface of the side sill 12, and the outboard side surface of the rear lower member 13.

According to another embodiment, a front surface of the front pillar 11 facing the front of the vehicle may serve as the mounting surface 61, a front surface of the side sill 12 facing the front of the vehicle may serve as the mounting surface 62, and an outboard side surface of the rear lower member 13 facing the exterior of the vehicle may serve as the mounting surface 63. Thus, the connection member 30 may be joined to the front surface of the front pillar 11, the front surface of the side sill 12, and the outboard side surface of the rear lower member 13.

According to another embodiment, an inboard side surface of the front pillar 11 facing the interior of the vehicle may serve as the mounting surface 61, an inboard side surface of the side sill 12 facing the interior of the vehicle may serve as the mounting surface 62, and an outboard side surface of the rear lower member 13 facing the exterior of the vehicle may serve as the mounting surface 63. Thus, the connection member 30 may be joined to the inboard side surface of the front pillar 11, the inboard side surface of the side sill 12, and the outboard side surface of the rear lower member 13.

According to another embodiment, an inboard side surface of the front pillar 11 facing the interior of the vehicle may serve as the mounting surface 61, an outboard side surface of the side sill 12 facing the exterior of the vehicle may serve as the mounting surface 62, and an outboard side surface of the rear lower member 13 facing the exterior of the vehicle may serve as the mounting surface 63. Thus, the connection member 30 may be joined to the inboard side surface of the front pillar 11, the outboard side surface of the side sill 12, and the outboard side surface of the rear lower member 13.

As described above, the position of the connection member 30 may be varied by 75 (5×5×3) combinations based on table 1.

Figure 11:
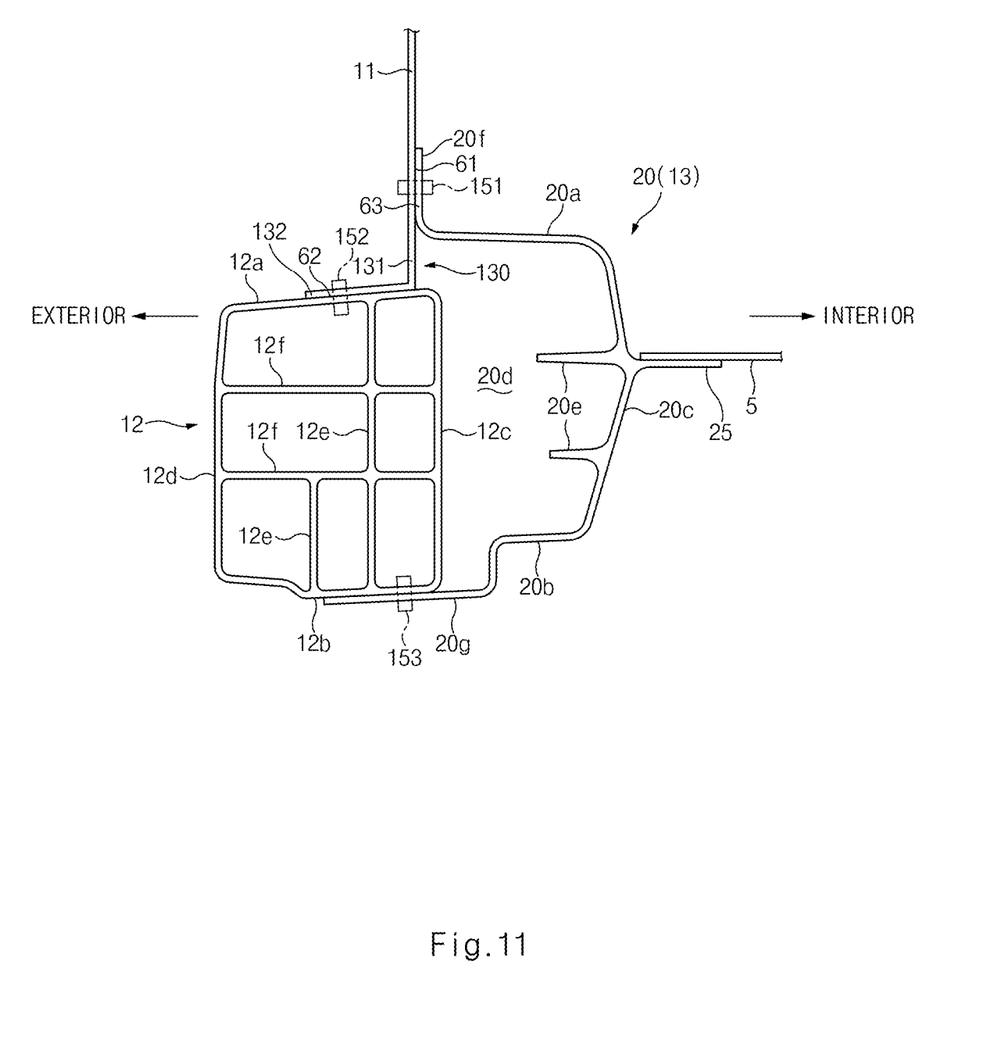
FIG. 11 illustrates a vehicle body structure according to another embodiment of the present disclosure.

Referring to FIG. 11, according to another embodiment of the present disclosure, a connection member 130 may be integrally connected to the bottom end of the front pillar 11. In other words, the connection member 130 and the front pillar 11 may form a unitary one-piece structure. Specifically, the connection member 130 may include an extension wall 131 extending vertically from the bottom end of the front pillar 11 and a mounting wall 132 extending horizontally from a bottom end of the extension wall 131. The mounting surface 61 of the front pillar 11 may directly contact the mounting surface 63 of the rear lower member 13. The mounting surface 61 of the front pillar 11 may be joined to the mounting surface 63 of the rear lower member 13 through a first joint 151. In other words, the mounting surface 61 of the front pillar 11 and the mounting surface 63 of the rear lower member 13 may overlap and be joined. The mounting surface 61 of the front pillar 11 may be the inboard side surface of the bottom end portion of the front pillar 11 facing the interior of the vehicle, and the mounting surface 63 of the rear lower member 13 may be the outboard side surface of the vertical flange 20f facing the exterior of the vehicle. The mounting wall 132 may be parallel to the mounting surface 62 of the side sill 12. The mounting wall 132 may be joined to the mounting surface 62 of the side sill 12 by using fasteners, welding, and/or the like. The mounting wall 132 may be joined to the mounting surface 62 of the side sill 12 through a second joint 152. The horizontal flange 20g of the rear lower member 13 may be joined to the bottom wall 12b of the side sill 12 through a third joint 153.

Figure 12:
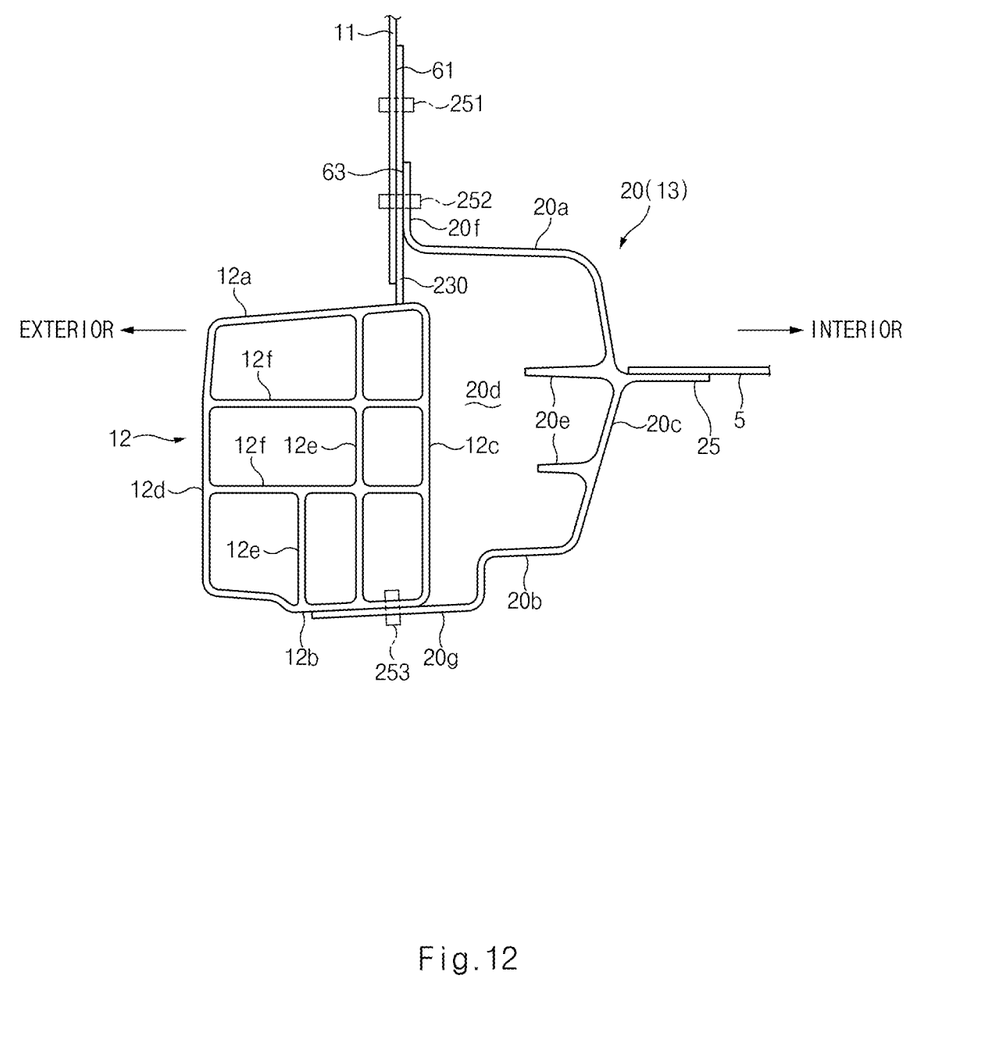
FIG. 12 illustrates a vehicle body structure according to another embodiment of the present disclosure.

Referring to FIG. 12, according to another embodiment of the present disclosure, a connection member 230 may be integrally connected to the side sill 12. In other words, the connection member 230 and the side sill 12 may form a unitary one-piece structure. Specifically, the connection member 230 may serve as a mounting wall extending vertically from a top end of the side sill 12. The connection member 230 may be parallel to the mounting surface 61 of the front pillar 11 and the mounting surface 63 of the rear lower member 13. As the connection member 230 is interposed between the mounting surface 61 of the front pillar 11 and the mounting surface 63 of the rear lower member 13, the connection member 230 may tightly contact the mounting surface 61 of the front pillar 11 and the mounting surface 63 of the rear lower member 13. The connection member 230 may be jointed to the mounting surface 61 of the front pillar 11 and the mounting surface 63 of the rear lower member 13 by using fasteners, welding, and/or the like. An upper portion of the connection member 230 may be joined to the mounting surface 61 of the front pillar 11 through a first joint 251. A lower portion of the connection member 230 may be joined to the mounting surface 63 of the rear lower member 13 through a second joint 252. The horizontal flange 20g of the rear lower member 13 may be joined to the bottom wall 12b of the side sill 12 through a third joint 253. The mounting surface 61 of the front pillar 11 may be the inboard side surface of the bottom end portion of the front pillar 11 facing the interior of the vehicle, and the mounting surface 63 of the rear lower member 13 may be the outboard side surface of the vertical flange 20f facing the exterior of the vehicle.

Figure 13:
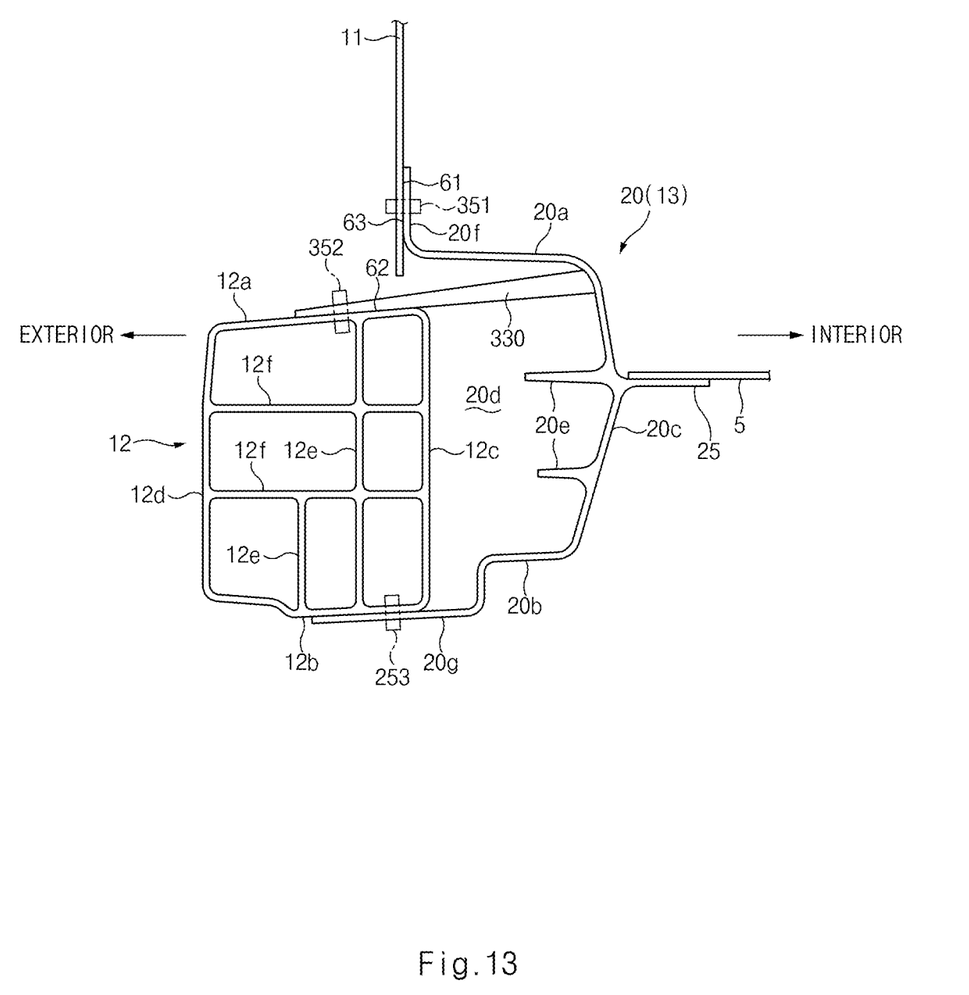
FIG. 13 illustrates a vehicle body structure according to another embodiment of the present disclosure.

Referring to FIG. 13, according to another embodiment of the present disclosure, a connection member 330 may be integrally connected to the rear lower member 13. In other words, the connection member 330 and the rear lower member 13 may form a unitary one-piece structure. Specifically, the connection member 330 may serve as a mounting wall extending from the inboard side wall 20c of the main body 20 of the rear lower member 13 toward the side sill 12. The connection member 330 may be parallel to the mounting surface 62 of the side sill 12, and the connection member 330 and the mounting surface 62 of the side sill 12 may overlap and be joined. The connection member 330 may be joined to the mounting surface 62 of the side sill 12 by using fasteners, welding, and/or the like. The mounting surface 61 of the front pillar 11 and the mounting surface 63 of the rear lower member 13 may overlap and be joined. The mounting surface 61 of the front pillar 11 may directly contact the mounting surface 63 of the rear lower member 13. The mounting surface 61 of the front pillar 11 may be joined to the mounting surface 63 of the rear lower member 13 through a first joint 351. A free end portion of the connection member 330 may be joined to the mounting surface 62 of the side sill 12 through a second joint 352. The horizontal flange 20g of the rear lower member 13 may be joined to the bottom wall 12b of the side sill 12 through a third joint 353. The mounting surface 61 of the front pillar 11 may be the inboard side surface of the bottom end portion of the front pillar 11 facing the interior of the vehicle, the mounting surface 62 of the side sill 12 may be the top surface of the top wall 12a facing the top of the vehicle, and the mounting surface 63 of the rear lower member 13 may be the outboard side surface of the vertical flange 20f facing the exterior of the vehicle.

As set forth above, according to embodiments of the present disclosure, the front pillar, the side sill, and the rear lower member may be firmly connected by the connection member so that crashworthiness may be improved and impact energy may be uniformly distributed. Thus, in the event of a vehicle impact/collision, the front portion of the vehicle body including the front pillar may not be easily deformed, and the bottom end portion of the front pillar and the top end portion of the rear lower member may not be easily separated from each other.

Hereinabove, although the present disclosure has been described with reference to several embodiments and the accompanying drawings, the present disclosure is not limited thereto. The disclosed embodiments may be variously modified and altered by those having ordinary skill in the art to which the present disclosure pertains without departing from the spirit and scope of the present disclosure claimed in the following claims.

What is claimed is:

1. A vehicle body structure comprising:
a front pillar joined to a dash panel;
a front side member extending from the dash panel toward the front of a vehicle;
a side sill connected to a bottom end of the front pillar;
a rear lower member connecting a rear portion of the front side member and a front portion of the side sill; and
a connection member connecting at least two of the front pillar, the side sill, and the rear lower member,
wherein the connection member is integrally connected to the front pillar so that the connection member and the front pillar form a unitary one-piece structure.

2. The vehicle body structure according to claim 1, wherein
the connection member includes an extension wall extending vertically from the bottom end of the front pillar and a mounting wall extending horizontally from a bottom end of the extension wall,
the mounting wall is parallel to the mounting surface of the side sill, and
the mounting wall is joined to the mounting surface of the side sill.

3. The vehicle body structure according to claim 2, wherein the mounting surface of the front pillar is joined to the mounting surface of the rear lower member.

4. A vehicle body structure comprising:
a front pillar joined to a dash panel;
a front side member extending from the dash panel toward the front of a vehicle;
a side sill connected to a bottom end of the front pillar;
a rear lower member connecting a rear portion of the front side member and a front portion of the side sill; and
a connection member connecting at least two of the front pillar, the side sill, and the rear lower member,
wherein the connection member is integrally connected to the side sill so that the connection member and the side sill form a unitary one-piece structure.

5. The vehicle body structure according to claim 4, wherein
the connection member is a mounting wall extending vertically from a top end of the side sill,
the connection member is parallel to the mounting surface of the front pillar and the mounting surface of the rear lower member, and
the connection member is joined to the mounting surface of the front pillar and the mounting surface of the rear lower member.

6. A vehicle body structure comprising:
a front pillar joined to a dash panel;
a front side member extending from the dash panel toward the front of a vehicle;
a side sill connected to a bottom end of the front pillar;
a rear lower member connecting a rear portion of the front side member and a front portion of the side sill; and
a connection member connecting at least two of the front pillar, the side sill, and the rear lower member,
wherein the connection member is integrally connected to the rear lower member so that the connection member and the rear lower member form a unitary one-piece structure.

7. The vehicle body structure according to claim 6, wherein
the connection member is a mounting wall extending from the rear lower member toward the side sill,
the connection member is parallel to a top surface of the side sill, and
the connection member is joined to the top surface of the side sill.

8. The vehicle body structure according to claim 7, wherein the mounting surface of the front pillar is joined to the mounting surface of the rear lower member.

* * * * *